(12) United States Patent
Chen

(10) Patent No.: US 6,480,195 B1
(45) Date of Patent: Nov. 12, 2002

(54) METHOD AND APPARATUS FOR GENERATING A STRAIGHT LINE

(75) Inventor: Jim X. Chen, Fairfax, VA (US)

(73) Assignee: George Mason University, Fairfax, VA (US)

( * ) Notice: Subject to any disclaimer, the term of this patent is extended or adjusted under 35 U.S.C. 154(b) by 0 days.

(21) Appl. No.: 09/390,468

(22) Filed: Sep. 3, 1999

Related U.S. Application Data

(60) Provisional application No. 60/099,302, filed on Sep. 4, 1998.

(51) Int. Cl.$^7$ ............................................... G06T 11/20
(52) U.S. Cl. ....................................................... 345/443
(58) Field of Search ................................... 345/443, 16

(56) References Cited

U.S. PATENT DOCUMENTS 5,604,852 A  *  2/1997  Watters et al. ............... 395/143
5,847,715 A  * 12/1998  Fujita et al. .................. 345/443

* cited by examiner

*Primary Examiner*—Jeffery Brier
*Assistant Examiner*—G. F. Cunningham
(74) *Attorney, Agent, or Firm*—David Grossman

(57) ABSTRACT

An apparatus, method and computer readable medium containing a program are described for generating a line corresponding to a desired straight line, including identifying a plurality of segments between two endpoints of the desired straight line to be generated, and generating the line corresponding to the desired straight line comprising identifying, in parallel, pixels in each of more than one of the segments. By processing in parallel, processor time is reduced. Also, anti-aliasing techniques can be similarly performed in parallel to reduce processor time.

7 Claims, 8 Drawing Sheets

METHOD AND APPARATUS FOR GENERATING A STRAIGHT LINE

This application claims priority on provisional Application No. 60/099,302 filed on Sep. 4, 1998, the entire contents of which are hereby incorporated by reference.

BACKGROUND OF THE INVENTION

1. Field of the Invention

The present invention relates to, a method and apparatus for generating a straight line, and more particularly, to a method and apparatus that generates a straight line by parallel processing multiple segments corresponding to that straight line, thereby enhancing efficiency.

2. Description of the Related Art

As shown in FIG. 1, conventional display devices are formed by an array of display units, generally pixels, that are arranged of horizontal rows and vertical columns. Many devices perform scan-conversion and reproduction of straight lines including but not limited to horizontal and vertical lines, such as line 11 of FIG. 1. To enable this scan-conversion and reproduction, various approaches have been proposed, two of which are described hereinafter.

A first approach involves scan-converting a straight line by storing each pixel's address and intensity used to represent that line in memory, and reproducing those pixels as needed in another memory (e.g., a frame buffer). This approach requires very little processor time. However, because this approach relies on the storage and retrieval of a large amount of pixel data (e.g., addresses and intensities) in memory, it is memory intensive.

The second approach involves scan-converting straight lines by using only the endpoints of the straight lines, and reproducing the pixels therebetween using an algorithm that is based on those endpoints. Specifically, as shown in FIG. 2, an algorithm may be iteratively performed to identify a series of pixels sequentially along a desired straight line. An incremental technique developed by Bresenham has been used in this fashion. In FIG. 2, the iterations are performed to sequentially identify a series of pixels beginning with a leftmost pixel ($x_i$, Round ($y_i$)) followed by the identification of a next pixel ($x_{i+1}$, Round ($y_{i+m}$)), and thereafter each subsequent pixel along the line. In this manner, Bresenham's incremental technique is iteratively repeated until all pixels within the line are reproduced, one computation per pixel.

The second approach is less memory intensive. However, this approach requires increased processor time since a separate computation must be iteratively performed to identify each pixel between the stored endpoints.

Regardless of the method used for scan-converting and reproducing a straight line, a certain amount of error is unavoidable for most straight lines because they are not generally aligned with rows or columns of the pixel array that forms the display. FIG. 3A shows how this error results in an effect known as "aliasing" of the line ultimately reproduced on the display. To avoid aliasing, conventional systems have applied anti-aliasing techniques. Most of these techniques involve emphasizing and de-emphasizing pixels used to represent a desired line based on their relative distance from the desired line. Using these anti-aliasing techniques, errors in the produced line become less noticeable, as illustrated by FIG. 3B which shows the effects of anti-aliasing techniques on the line of FIG. 3A.

Generally, anti-aliasing techniques require complex and taxing computations that must be repeated for each pixel to be displayed. For instance, proceeding along the line, a separate computation must be performed for each pixel sequentially to determine the error between that pixel and the desired line to be displayed. Then, before beginning computations for a next pixel, the intensity of the pixel is adjusted based on the error determined. As such, like the computations performed in Bresenhams's incremental technique, the anti-aliasing computations are performed sequentially, and the number of separate computations increase proportional to increases in the length of, and therefore the number of pixels, within the line being reproduced. When employed in combination with conventional algorithms that are performed sequentially for all pixels, such as Bresenham's incremental technique described above, conventional anti-aliasing techniques increase the amount of processing time needed by approximately ninety (90) times.

SUMMARY OF THE INVENTION

The present invention is directed to a method and apparatus that substantially obviate one or more of the problems experienced due to the above and other limitations and disadvantages of the related art.

Objects, features and advantages of the present invention will be set forth in the description that follows, and in part will become apparent from the detailed description, or may be learned by practice of the invention.

To achieve these and other advantages and in accordance with the purposes of the present invention, as embodied and broadly described herein, the present invention includes a method for generating a line corresponding to a desired straight line, the method identifying a plurality of segments between two endpoints of the desired straight line to be generated, and generating the line corresponding to the desired straight line comprising identifying, in parallel, pixels in each of more than one of the segments.

The multiple segments may be identified by identifying a segment of a display pixel array located between pixels that correspond to two points in the straight line to be generated.

To generate the line, pixels within one segment of the multiple segments are identified, and then pixels within other of the multiple segments are identified in parallel based on the pixels identified within the one segment. The process of identifying pixels within the one segment may involve identifying a series of all pixels within the one segment before identifying pixels in any of the other segments, and the process of identifying pixels may involve identifying a series of all pixels within each of the other segments in parallel based on the series of all pixels identified within the one segment. Alternatively, the process of identifying pixels within the one segment may involve identifying less than all pixels within the one segment before identifying corresponding pixels in any of the other segments, and identifying a corresponding group of less than all pixels within each of the other segments in parallel based on the pixels identified within the one segment. In this manner, it is possible to generate the line by simultaneously identifying at least one pixel within each of the multiple segments, e.g., by simultaneously identifying a single corresponding pixel within each of the multiple segments.

Alternatively, the generating may involve identifying a group of at least one (but less than all) corresponding pixels within each of the multiple segments, and identifying a next group of at least one (but less than all) corresponding pixels within each of the multiple segments, where the groups include a single pixel from within each of the multiple segments. The generating also involving controlling an intensity of pixels used to generate the straight line based on an error in position between each pixel and the straight line being generated, respectively.

In addition to the above, the method may include determining the intensity of pixels in a first of the segments, and determining the intensity of pixels in other of the segments based on the intensity determined for the first of the segments.

The multiple segments may be identified based on its slope, the slope being determined based on two endpoints of the straight line. The multiple segments may be identified along the desired straight line or along a line that approximates the desired straight line. To identify the segments, a specified slope interval may be identified based on the determined slope, the specified slope interval being identified from within a stored slope table in which lines are categorized based on ranges of slope such that lines within any particular range of slope are approximated using a same approximate line. Furthermore, the process of identifying multiple line segments may include applying an iterative algorithm that is selected based on the slope to identify multiple line segments located at specified intervals of horizontal and vertical distance from a first of the points on the desired straight line, the multiple line segments approximating the desired straight line, wherein the specified intervals are determined based on a stored slope table in which lines are categorized based on ranges of slope such that lines within any particular range of slope are approximated using a same approximate line.

The present invention may also be embodied in a computer readable medium having embodied thereon a computer program for processing by a computer, the computer program being capable of performing all of the above-described processes, including identifying a plurality of segments between two endpoints of the desired straight line to be generated, and generating the line corresponding to the desired straight line comprising identifying, in parallel, pixels in each of more than one of the segments. The computer readable medium may be a physical object such as, e.g., a floppy or hard diskette, or it may be a propagated signal such as, e.g., a carrier wave.

The present invention may also be embodied as an apparatus including hardware capable of generating a straight line on a display, the apparatus being capable of performing the above-described processes, including identifying a plurality of segments between two endpoints of the desired straight line to be generated, and generating the line corresponding to the desired straight line comprising identifying, in parallel, pixels in each of more than one of the segments.

BRIEF DESCRIPTION OF THE DRAWINGS

The present invention will become more fully understood from the detailed description given hereinbelow and the accompanying drawings, which are given by way of illustration only and thus are not limitative of the present invention, and wherein.

DETAILED DESCRIPTION OF THE PREFERRED EMBODIMENTS OF THE PRESENT INVENTION

Figure 1:
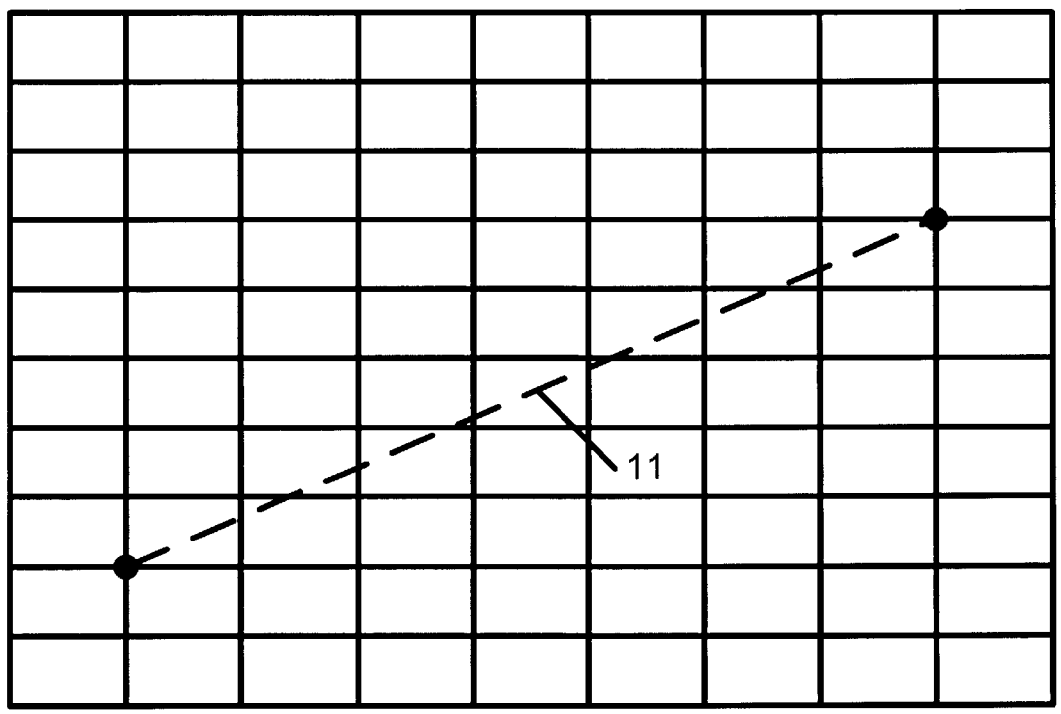
FIG. 1 is a schematic view illustrating a conventional display having an array of pixels arranged with horizontal rows and vertical columns, and whereupon a straight line is formed.
Figure 2:
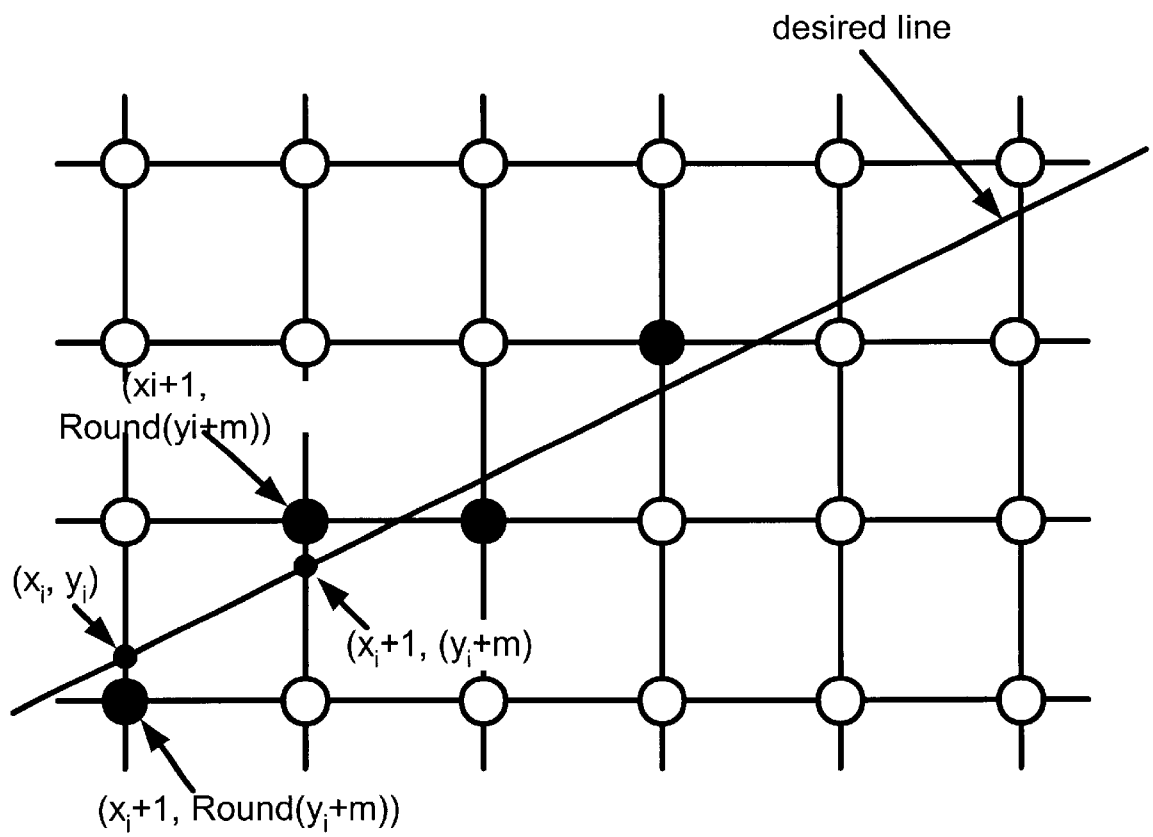
FIG. 2 illustrates a series of pixels that are identified in series along a desired straight line to be generated iteratively according to a related art algorithm.
Figure 3A:
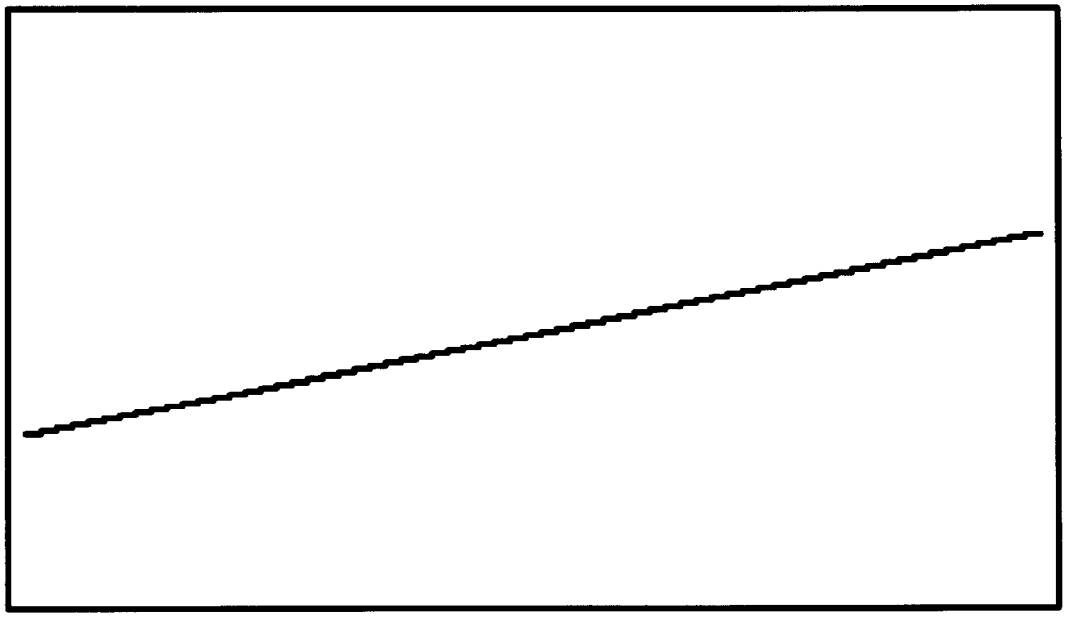
FIGS. 3A and 3B illustrate a line that is reproduced with aliasing and anti-aliasing techniques, respectively.
Figure 3B:
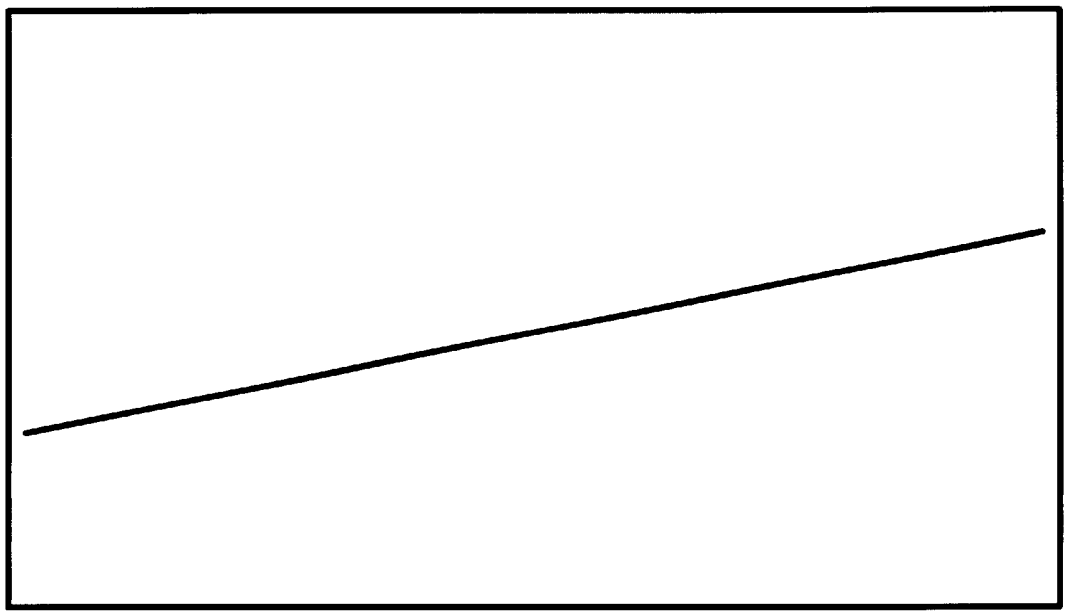

Reference will now be made in detail to the preferred embodiments of the present invention, examples of which are illustrated in the accompanying drawings. In the drawings, redundant description of like elements and processes, which are designated with like reference numerals, is omitted for brevity.

Figure 4A:
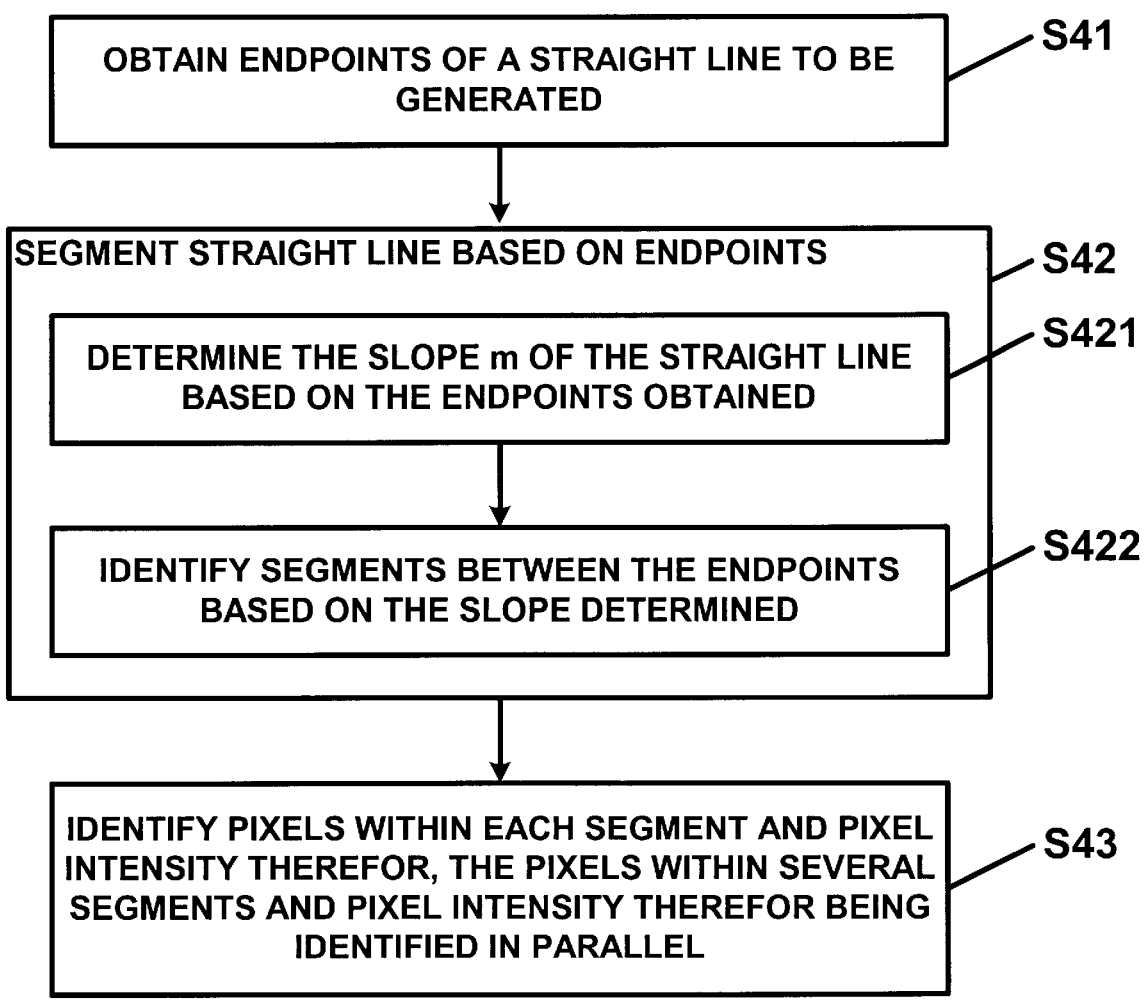
FIG. 4A is a flowchart illustrating a process performed in accordance with a preferred embodiment of the present invention to generate a desired straight line using segmentation, thereby enabling parallel processing of pixels within several segments of the desired straight line.
Figure 4B:
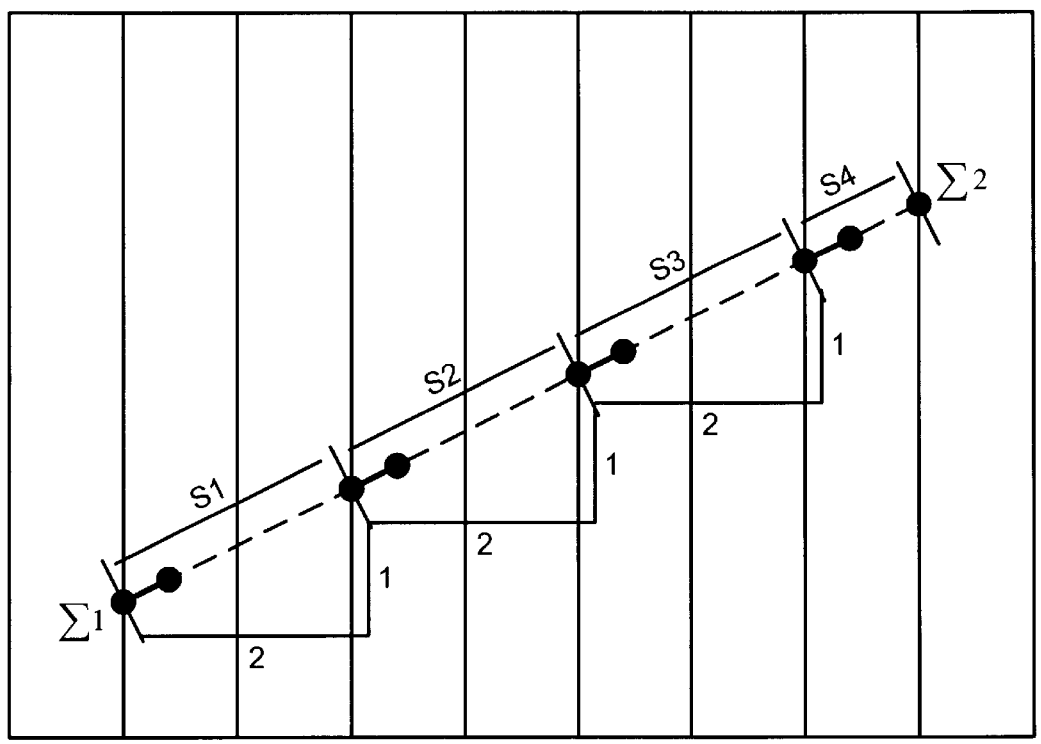
FIG. 4B illustrates generation of a desired straight line via segmentation in accordance with the preferred embodiment.

A first preferred embodiment of the present invention is described with reference to FIGS. 4A and 4B. FIG. 4A is a flowchart illustrating a process performed in accordance with a first preferred embodiment of the present invention, the process resulting in the generation of a straight line on a display as shown in FIG. 4B.

In step S41 of the flowchart of FIG. 4A, endpoints of the straight line are obtained. Among other things, the endpoints may represent the beginning and conclusion of a line, edges of an object, or endpoints of line segments within a grander object to be generated. Methods used to obtain the endpoints of the straight line include receiving transmissions of endpoints from a remote system and retrieving the endpoints from a memory or storage unit. In FIG. 4B, two endpoints are obtained, namely first endpoint E1 and second endpoint E2. However, it is possible for more than two endpoints to be obtained in step S41.

In step S42, the straight line is segmented into a plurality of segments based on the endpoints obtained. For instance, FIG. 4B shows the identification of four segments between endpoints E1 and E2, the segments being identified by references S1–S4. The length of each segment, and therefore number of pixels within each segment, is preferably no greater than the length or number of pixels in the first segment S1. Furthermore, the length or number of pixels within each segment is preferably equal, but the length or number of pixels in the final segment may be less than the other segments, as shown for example by segment S4 of FIG. 4B which is shorter than segments S1–S3. Each segment identified in step S42 has an identical slope (m) that is generally defined by the slope (m) of the line connecting the endpoints obtained in step S41.

In step S43, pixels within each segment are identified, the pixels within several of the segments being identified in parallel. Several different techniques are available for performing the identification of step S43. One such technique involves identifying pixels within each segment S1–S4 by parallel processing an algorithm. For instance, applying Bresenham's incremental technique with respect to each of the different segments simultaneously, the pixels within each of the segments may be determined in parallel. That is, based on the segmentation performed in step S42, the endpoints of each segment (e.g., S1–S4) are known. Based on these segment endpoints, an incremental technique such as Bresenham's incremental technique may be used to identify the pixels within more than one of those segments simultaneously. In this manner, a first pixel within each segment (e.g., S1–S4) can be determined simultaneously, and thereafter, second and subsequent pixels within each segment are each simultaneously determined in turn. Alternatively, step S43 may be performed by determining one or more pixels within a first segment (e.g., segment S1 of FIG. 4B) using an algorithm such as Bresenham's incremental technique [Bresenham, J. E., "A Linear Algorithm for Incremental Digital Display of Digit," Comm. ACM20, No. 2 (1977), 100–106] and thereafter performing a simpler algorithm or technique to determine pixels within the second and subsequent segments (e.g., S2–S4) based on the pixels determined for the first segment (e.g., S1). More specifically, once a pixel is determined for a first segment, a corresponding pixel can be determined for each subsequent segment based on the slope which remains constant along the straight line formed by the segments. For instance, once a pixel is identified within segment S1 using conventional techniques, that pixel can be used in combination with the slope of the line formed by the segments and the length of the segments to identify corresponding pixels in each of the other segments S2–S4 in parallel, eliminating the need to sequentially perform the conventional identification techniques for the pixels within segments S2–S4. In this manner, the pixels within segments S2–S4 can be identified incrementally with the pixels of segment S1, or the pixels within segments S2–S4 can be identified after all of the pixels within segment S1 have been determined.

Regardless of the techniques used to perform steps S42 and S43, the segmentation performed by the present invention enables identification of pixels within several segments of a straight line, in parallel. This parallel processing results in tremendous increases in processing speed without significantly burdening memory or storage capacities.

With this general understanding of the process, the following describes four (4) approaches contemplated to perform the segmentation described with respect to step S42. The following four approaches are merely examples; with an understanding of the invention, other approaches would be readily appreciated by those in the art.

First, the endpoints obtained in step S41 can be used to determine a length of the straight line to be generated, and that length can be divided into a predetermined number of segments having an equal or predetermined length. This approach may be easily performed by modern processors, but may involve extended processing time.

The second approach to segmentation involves three stages. First, a conventional technique is iteratively performed to identify a series of several pixels along the desired line, sequentially. Second, after each one of the several pixels is identified, an algorithm is performed to determine whether all identified pixels, including the currently identified pixel and each of the other previously identified pixels, are sufficiently representative of the entire line that they form a first segment that represents the desired line with sufficient specificity to enable identification of remaining pixels of the line by replicating that segment.

If the identical pixels are not sufficiently representative of the desired line, the first and second steps are repeated to identify yet another pixel and again test the sufficiency of the pixels identified. However, if the identical pixels are sufficiently representative, a third stage is performed to segment the remainder of the line based on the segment defined by those identified pixels, and then pixels within the remaining segments are identified based on the previously identified pixels as suggested in step S43. In this manner, only the pixels of the first segment are identified sequentially using an iterative algorithm.

Each of the third and fourth approaches to segmentation involves the use of slope. Specifically, as illustrated by FIG. 4A, these approaches each involve two stages. In a first stage corresponding to step S421 of FIG. 4A, the slope (m) of the desired straight line to be generated is determined based on the endpoints obtained in step S41 (e.g., E1 and E2 of FIG. 4B). One of ordinary skill would readily appreciate that the slope (m) of the line can be determined in step S421 by employing various known algorithms, most commonly:

$$m=(y_2-y_1)/(x_2-x_1) \qquad (1),$$

where the slope is denoted m, and the coordinates of the endpoints are denoted $(x_1, y_1)$ and $(x_2, y_2)$, respectively. In a second stage corresponding to step S422 of FIG. 4A, the line is segmented based on the slope identified in step S421. For instance, in FIG. 4B, the line is segmented into four (4) segments S1–S4 based on the slope determined in step S421.

The third and fourth approaches to segmentation differ in the process used to segment the line, e.g., step S422. In the third approach to segmentation, segments of the line are identified by comparing the slope with a set of stored slope values and segmenting the desired line based on stored information when a matching slope is found in memory. If a matching slope is not identified in memory, segmentation is not achieved by the third approach, and the pixels are therefore identified sequentially without segmentation. This approach utilizes a stored table that relates a set of possible anticipated slopes corresponding to information that is useful in segmenting those particular slopes, such as horizontal and vertical distances appropriate for segmenting a line having the slope identified.

As mentioned, the fourth and preferred approach to segmentation also involves the use of slope, the slope being determined as described above with respect to S421. However, rather than identifying segments positioned directly between the endpoints, and therefore along the desired straight line, this preferred method uses the slope determined in step S421 to identify an approximation of the line for which segmentation has been predetermined. This process is illustrated by the flowchart of FIG. 5A and the results of this process are illustrated in FIG. 5B.

Figure 5A:
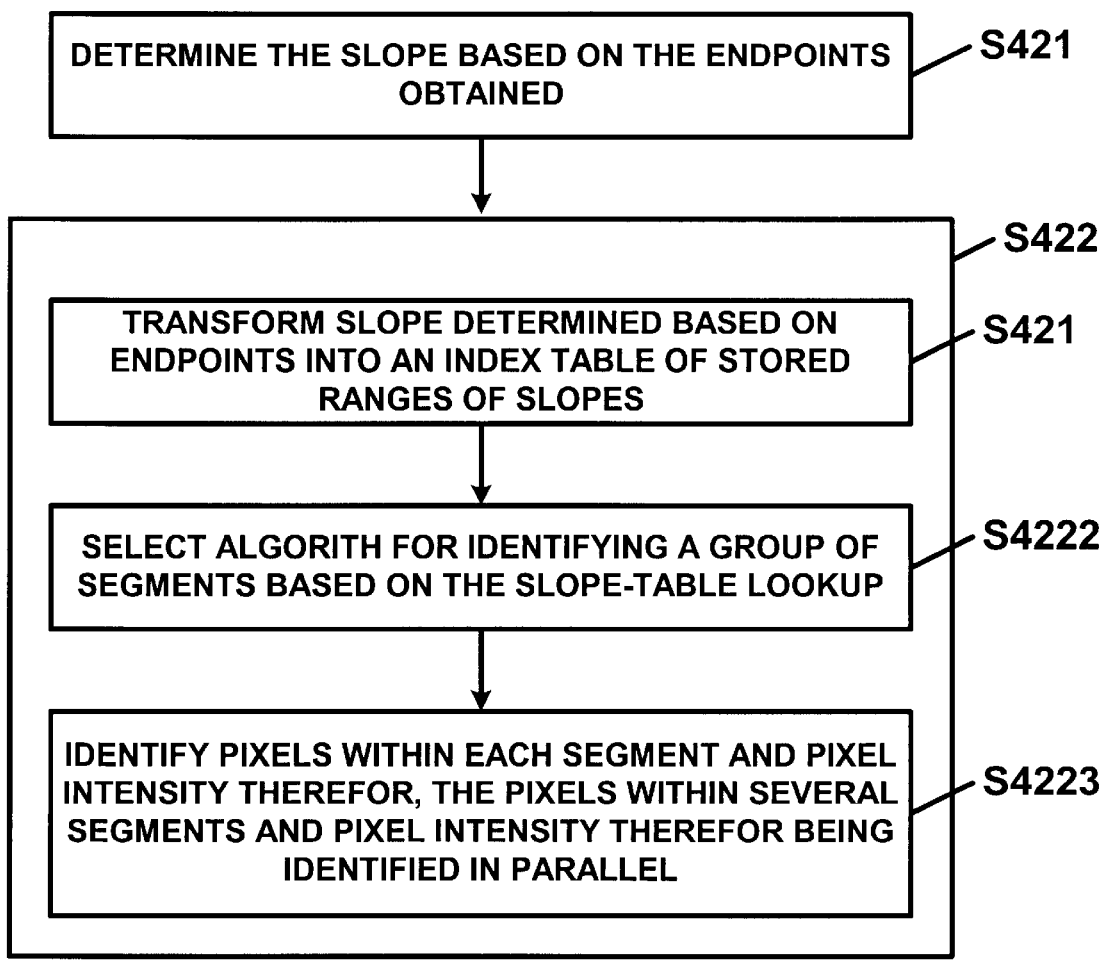
FIG. 5A is a flowchart illustrating a process performed in accordance with a second preferred embodiment of the present invention to approximate lines in order to increase segmentation therefore.

As shown in FIG. 5A, step S422 of FIG. 4A, which identified segments between the endpoints based on the slope, is replaced by steps S4221–S4223. In step S4221, the slope defined by the endpoints is used as a pointer to a range of slopes stored in memory. If the slope defined by the endpoints is within one of the stored ranges, criteria for segmenting a line having a slope within the matching range is identified and used for segmentation.

Figure 5B:
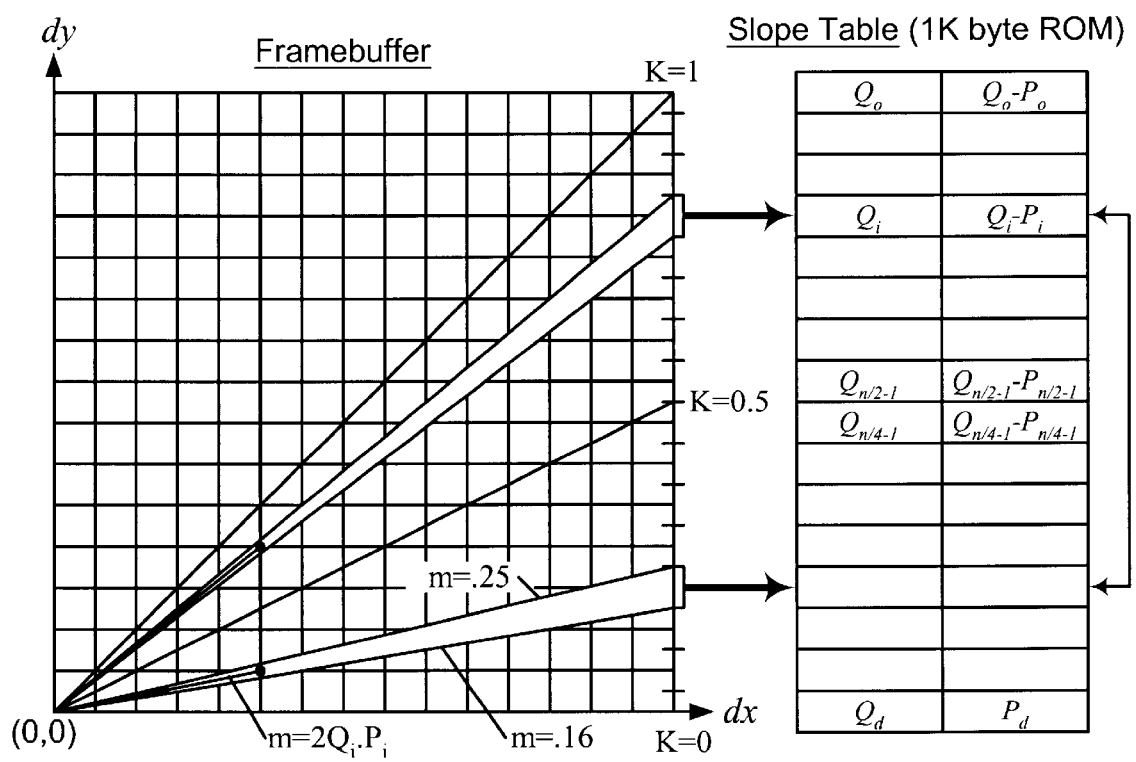
FIG. 5B illustrates a slope table stored and referenced in accordance with the second preferred embodiment of the present invention.

A slope table such as that shown by FIG. 5B may be stored in memory to enable such a reference and provide such segmentation criteria. The slope table of FIG. 5B equates a series of slope ranges to a specified algorithm or specific data for segmenting. In this manner, the slope table relates a single algorithm or group of segmentation information to lines having several different slopes, so long as the slopes fall within a predetermined range. According to the exemplary slope table shown in FIG. 5B, for instance, lines having slopes ranging from 0.16<m<0.25 are each provided with the same algorithm or group of segmentation information, namely horizontal distance Q=$Q_i$ and vertical distance P=$P_i$. Because the specified algorithm or segmentation information applies to several lines having several different slopes, the segmentation realized based on the specified algorithm or data will be the same for each of several lines having different slopes, thereby providing an approximation for all but a single line within the range defined in memory. The approximation can be illustrated using the exemplary table shown in FIG. 5B. Specifically, as illustrated and described above, according to the slope table of FIG. 5B, lines having slopes of 0.16<m<0.25 are each segmented according to the same information, namely a horizontal distance Q=$Q_i$ and vertical distance P=$P_i$. As shown, this segmenting information results in a series of line segments that have a slope of m=0.2. Because each of the techniques used to identify pixels in step S43 are based on the segments, not the original endpoints defining the desired line, the same line of slope m=0.2 will be generated for endpoints defining lines having slopes ranging from 0.16<m<0.25. In this manner, the line of slope m=0.16 and line of slope m=0.25 will be approximated by a line formed of segments having slope m=0.2.

That is, unlike the third approach to segmentation which identified specific segmentation data particular to each of several lines having different slopes that are stored in memory, the fourth approach to segmentation identifies segmentation data particular to a range of slopes, necessarily approximating the segmentation for most of the particular lines within the range. The fourth approach to segmentation is therefore able to provide segmentation data for an increased number of lines without taxing the memory by storing specific segmentation data for each of those lines. Furthermore, because the naked eye is generally unable to detect minor differences between similar lines, the segmentation performed based on the approximations utilized in the fourth approach result in insignificant distortions on a display.

The above-described methods can be implemented via software or hardware. One or ordinary skill would readily appreciate that several methods are available for implementing this invention using hardware and software. One such software implementation is described hereinafter with reference to the following program listing written in C program language. This software implementation is merely illustrative of one particular viable implementation of the invention, and is not intended to limit the scope of the invention which would clearly be understood to include countless other software implementations that would be readily apparent to those of ordinary skill. That said, a software implementation is described by the following program list:

```
 1: Alg1_multisegment (int x0, int xn, int y0, int yn)
 2: { /* Scan-convert a line: (x0,y0)--(xn,yn) for 0<=slope<=1 */
 3: int dx,dy,incrE,incrNE,d,x,y,x1,Q,P,xm,ym;
 4:
 5: dx=xn-x0; dy=yn-y0;
 6: SlopeTable (dx,dy,&Q,&P); /* get Q & P from the slope table */
 7: d-2*P-Q; incrE=2*P; incrNE=2* (P-Q);
 8: x=x0; y=y0;
 9: x1=x+Q
 10
 11: /* scan-convert the 1st segment, copy to successive segments */
 12: while (1) {        /* multi-point copy */
 13: xm=x;ym=y;
 14: do {
 15:     writepixel (xm,ym);
 16:     xm+=Q;ym+=P;
 17: } while (xm<=xn);
 18: x++;
 19: if(x==x1) break;    /* exit */
 20: if(d<=0)
 21:     d+0incrE;
 22: else {
 23:     d+=incrNE;
 24:     y++;
 25: }
 26: }
 27: }
``` where where (x0,y0) and (xn,yn) are the two end points of the line; dx and dy are the run-length and rise-length of the line; Q and P are the run-length and rise-length of the first segment of the line; d is the decision factor used in the program iteration; incrE and incrNE are constants; (x,y) is the current pixel location of the iterative scan-conversion process in the program; (xm,ym) is the current pixel location in different segments corresponding to (x,y). Lines 14–17 are used to draw segments as described with respect to the third and fourth approaches to segmentation, and lines 18–25 are performed used to identify pixels in each of the segments in parallel.

Figure 6:
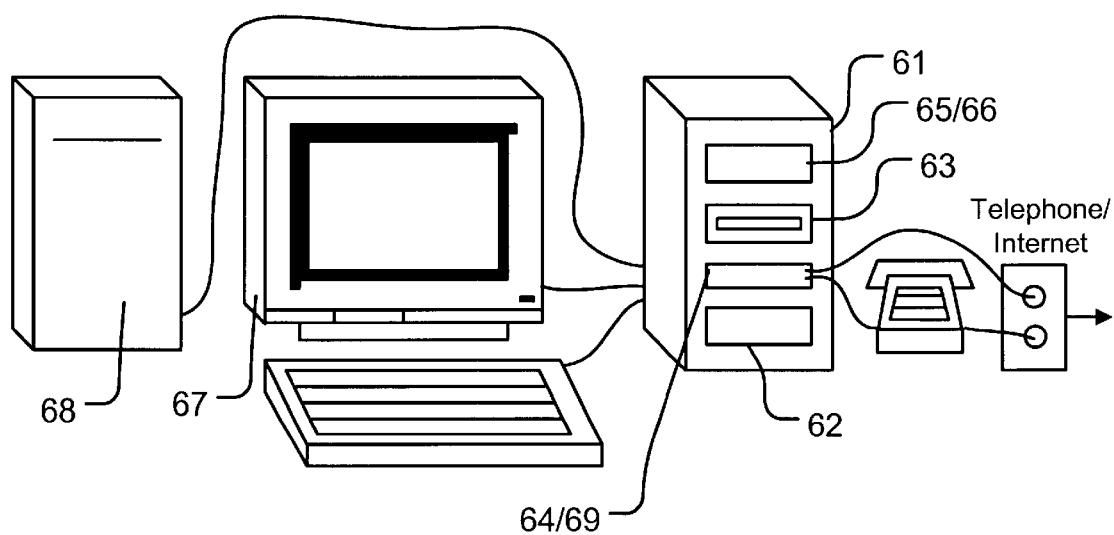
FIG. 6 illustrates a general purpose computer capable of performing the processes required by the preferred embodiments described above, including software implementations thereof.

The software implementations can be performed by a general purpose computer such as that shown in FIG. 6, which includes a central processing unit 61; a storage device 62 such as a hard disk drive; input device 63 such as a keyboard 63; telephone/interface 64; a floppy disk drive 65; and/or a compact or digital versatile disk drive 66; and an output device such as a display 66; printer 68; and/or telephone interface 69. The general purpose computer can store or receive a software implementation of the invention, such as those described above, or may include hardware configured to perform the processes described in this application. As indicated in the foregoing, those of ordinary skill would readily appreciate various implementations of this invention using computer hardware.

The parallel processing made possible by the segmentation performed by the present invention is also useful in reducing processor time when performing anti-aliasing techniques. Specifically, rather than performing processor intensive anti-aliasing algorithms sequentially for each pixel used to represent the straight line being generated, the present invention makes it possible to perform anti-aliasing techniques in parallel for pixels of several different segments within a single line being generated, or to apply anti-aliasing techniques to the pixels of a single segment and to apply the results to identify pixels within other segments of the straight line. Thus, unlike for each pixel in an entire line to determine how to anti-alias the line, the present invention enables calculation of aliasing errors for pixels in a single segment and avoids computations on pixels in subsequent segments by applying the results of the calculations to similar and corresponding pixels. In this manner, as illustrated by FIG. 4A, the anti-aliasing algorithm is applied in Step S43 when identifying pixels within each of the several segments. By either performing the anti-aliasing techniques in parallel for several segments of the straight line or by performing the anti-aliasing techniques on a single segment and applying the results to other subsequent segments, the present invention is able to achieve significant reductions in processing time.

To integrate the anti-aliasing techniques, thereby taking advantage of the parallel processing described above, various software and hardware implementations are available. One such software implementation is demonstrated by the following software code written in

```
1: Alg2_multisegment(int x0, int xn, int y0, int yn)
2: { /* Scan-convert a line with antialiasing. */
3: int dx,dy,incrE,incrNE,d,x,y,x1;
4: int Q,P,xm,ym,two_v_dx;
5: float invDenom,two_dx_invDenom;
6: float intensity1,intensity2,intensity3;
7:
8: dx=xn−x0; dy=yn−y0;
9: /* get Q & P from the Slope Table */
10: SlopeTable(dx,dy,&Q,&P);
11: d=2*P-Q; incrE=2*P; incrNE=2*(P-Q);
12: two_v_dx=0;
13: invDenom-1/(2*sqrt(Q*Q+P*P);
14: x=x0;y=y0;
15: x1=x+Q;
16: /* scan-convert the 1ˢᵗ segment, */
17: /* copy to successive segments */
18: while(1) {
19: intensity1=Filter(round(abs
20: (two_v_dx*inv/Denom)));
21: intensity2=Filter(round(abs
22: (two_dx_invDenom-two_v_dx*invDenom)));
23: intensity3=Filter(round(abs
24: (two_dx_invDenom+two_v_dx*invDenom)));
25: /* multi-point copy */
26: xm=x; ym=y;
27: do {
28: writepixel(xm,ym,intensity1);
29: writepixel(xm,ym+1,intensity2);
30: writepixel(xm,ym-1,intensity3);
31: xm*=Q;ym+=P;
32: } while (xm<=xn);
33: x++;
34: if(x==x1) breach; /*exit*/
35: if(d<=0) {
36: two_v_dx=d+Q
37: d+=incrE;
38: }
39: else {
40:      d+=increNE;
41:      y++;
42:    }
43:  }
44: }
``` where (x0,y0) and (xn,yn) are the two end points of the line; dx and dy are the run-length and rise-length of the line; Q and P are the run-length and rise-length of the first segment of the line; d is the decision factor used in the program iteration; incrE and incrNE are constants; (x,y) is the current pixel location of the iterative scan-conversion process in the program; (xm,ym) is the current pixel location in different segments corresponding to (x,y); two_v_dx is an iterative factor to calculate the pixel error; invDenom and two_dx_invDenom are two constants to calculate the pixel error; x1 is used to decide the termination of the program; intensity1, intensity2, and intensity3 are three pixel intensity values according to the corresponding pixel errors.

Again, like the first program listing, this program listing merely illustrates one particular viable implementation of the invention incorporating anti-aliasing techniques. Those of ordinary skill would readily appreciate that other software and hardware implementations of the conventional anti-aliasing techniques may be performed to take advantage of the parallel processing achieved through the segmentation described above.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefor, it is intended that the present invention not be limited to the particular embodiment disclosed as the best mode contemplated for carrying out the present invention, but that the present invention includes all embodiments falling within the scope of the appended claims.

The foregoing description and the drawings are regarded as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer of alternative inventive concepts that are included in the contents of the application and could be defined by claims differing in scope from the following claims, which different claims may be adopted subsequently during prosecution, for example, for the purposes of a continuation or divisional application.

What is claimed is:

1. A method for generating a line corresponding to a desired straight line, comprising:

identifying a plurality of segments of a repeating pattern between two endpoints of the desired straight line to be generated; and generating the line corresponding to the desired straight line comprising identifying, in parallel, pixels based on the repeating pattern in each of more than one of the segments;

wherein the generating by identifying in parallel corresponding pixels in each of more than one of the multiple segments comprises:

identifying pixels within one segment of the multiple segments; and identifying pixels within other of the multiple segments in parallel based on the pixels identified within the one segment;

wherein the identifying pixels within the one segment comprises identifying less than all pixels within the one segment before identifying corresponding pixels in any of the other segments; and wherein the identifying pixels comprises identifying a corresponding group of less than all pixels within each of the other segments in parallel based on the pixels identified within the one segment.

2. A method for generating a line corresponding to a desired straight line, comprising:

identifying a plurality of segments of a repeating pattern between two endpoints of the desired straight line to be generated; and generating the line corresponding to the desired straight line comprising identifying, in parallel, pixels based on the repeating pattern in each of more than one of the segments;

wherein the generating comprises:

simultaneously identifying at least one pixel within each of the multiple segments; and wherein the simultaneously identifying pixels comprises:

simultaneously identifying a single corresponding pixel within each of the multiple segments.

3. A method for generating a line corresponding to a desired straight line, comprising:

identifying a plurality of segments of a repeating pattern between two endpoints of the desired straight line to be generated; and generating the line corresponding to the desired straight line comprising identifying, in parallel, pixels based on the repeating pattern in each of more than one of the segments; and wherein the generating comprises:

identifying a group of at least one, but less than all, corresponding pixels within each of the multiple segments; and identifying a next group of at least one, but less than all, corresponding pixels within each of the multiple segments.

4. The method of claim 3, wherein the groups include a single pixel from within each of the multiple segments.

5. A method for generating a line corresponding to a desired straight line, comprising:

identifying a plurality of segments between two endpoints of the desired straight line to be generated; and generating the line corresponding to the desired straight line comprising identifying, in parallel, pixels in each of more than one of the multiple segments and simultaneously identifying a single corresponding pixel within each of the multiple segments.

6. A method for generating a line corresponding to a desired straight line, comprising:

identifying a plurality of segments between two endpoints of the desired straight line to be generated; and generating the line corresponding to the desired straight line comprising identifying, in parallel, pixels in each of more than one of the segments, and identifying a group of at least one, but less than all, corresponding pixels within each of the multiple segments and identifying a next group of at least one, but less than all, corresponding pixels within each of the multiple segments.

7. The method of claim 6, wherein the groups include a single pixel from within each of the multiple segments.

* * * * *